United States Patent [19]
Gehle et al.

[11] 4,373,757
[45] Feb. 15, 1983

[54] CONVEYOR TROUGH FOR A SCRAPER CONVEYOR FOR USE WITH A MINING MACHINE

[75] Inventors: Karl Gehle; Josef Schreier, both of Bochum, Fed. Rep. of Germany

[73] Assignee: Gebr. Eickhoff Maschinenfabrik und Eisengiesserei m.b.H., Bochum, Fed. Rep. of Germany

[21] Appl. No.: 214,782

[22] Filed: Dec. 9, 1980

[30] Foreign Application Priority Data

Dec. 13, 1979 [DE] Fed. Rep. of Germany ....... 2950169

[51] Int. Cl.³ .............................................. E21C 35/12
[52] U.S. Cl. ..................................... 299/43; 198/735; 198/860
[58] Field of Search ........................... 299/34, 42, 43; 198/735, 860

[56] References Cited

U.S. PATENT DOCUMENTS

| | | | |
|---|---|---|---|
| 3,752,299 | 8/1973 | Blumenthal et al. | 198/735 |
| 3,897,108 | 7/1975 | Krohm et al. | 299/43 X |
| 4,265,488 | 5/1981 | Schupphaus et al. | 299/34 X |
| 4,301,913 | 11/1981 | Bravn et al. | 198/735 |

FOREIGN PATENT DOCUMENTS

| | | |
|---|---|---|
| 1039927 | 3/1959 | Fed. Rep. of Germany . |
| 1201236 | 4/1966 | Fed. Rep. of Germany . |
| 842399 | 7/1960 | United Kingdom . |
| 1108466 | 4/1968 | United Kingdom . |

*Primary Examiner*—Ernest R. Purser
*Attorney, Agent, or Firm*—Thomas H. Murray; Clifford A. Poff

[57] ABSTRACT

A conveyor trough for a scraper conveyor is used as a way or track for an underground mining machine. The conveyor trough includes a trough base with lateral section members welded thereto along the longitudinal sides and form at each side a V-shaped space that extends from the plane of the trough base to the height of the section member. A lateral section member descends toward the floor at each side of the trough base where it extends to a flange parallel to the mine floor and projects from the lateral section from the lateral section member. The flange has a width and thickness to form a machineway or track. Divering arms at each side of the trough base extend to a flange which projects from the arm to extend parallel to the floor and forms a machineway or track by the width and thickness dimensions thereof.

7 Claims, 5 Drawing Figures

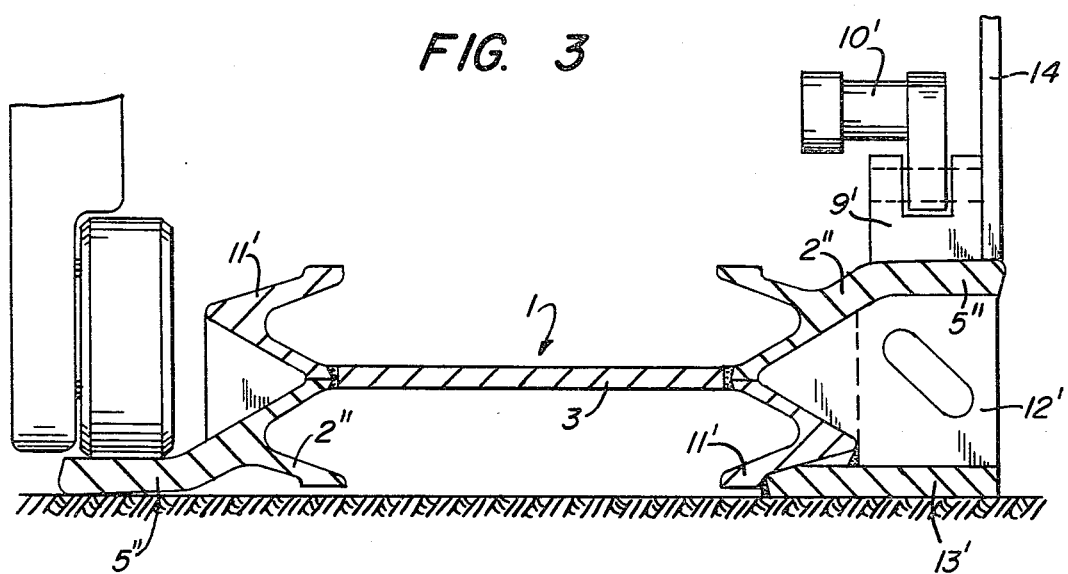
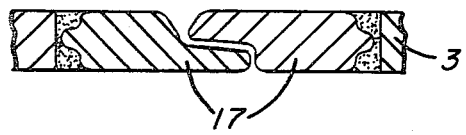
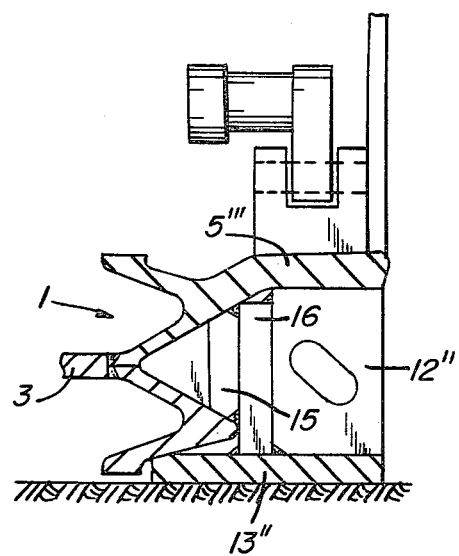

CONVEYOR TROUGH FOR A SCRAPER CONVEYOR FOR USE WITH A MINING MACHINE

BACKGROUND OF THE INVENTION

This invention relates to a conveyor trough for a scraper conveyor for use with a mining machine in underground mining wherein the conveyor trough is formed by a trough base and diverging arm sections projecting laterally from the longitudinal sides of the base forming intersecting boundaries of V-shaped spaces. Each space diverges outwardly and extends to flange sections extending from at least one of the upwardly-extending arm sections and from a downwardly-extending arm section. The flange sections each having a width and thickness to form a machineway with the upper flange section extending parallel to the mine floor for supporting a mining machine to move along the face conveyor.

An earlier proposal provides a conveyor trough of similar type and includes a way or track for an underground mining machine. The conveyor trough has a channel cross section with outer lateral section members welded to the trough base to form V-shaped recesses. The lateral section members bound the recesses and extend from the trough base downwardly toward the mine floor. A flange extends substantially parallel with the floor by projecting from a lateral section member. The bottom outer edge of the projecting flange is lower than the bottom flange surface of the lateral section member. The flange sections have a width and thickness to form a machineway or track.

The mining machine engages with the machineways or tracks of such a conveyor trough only in the immediate vicinity of the mine floor. However, it is customary in underground mining operations to use a cleaning attachment or a clearing plow with a mining machine, particularly shearer loaders. The cleaning attachment or plow moves in the lane or path between the face conveyor and the mine face while guided by a guide bar which is secured to the side wall of the face conveyor. The guide bar extends over the length of the machineway or track. Consequently, the top surface of the lateral section member of the conveyor trough is the only way or track that remains for the mining machine at least in the region which is near the mine face. The machine track of the face conveyor which is on the floor is covered by the guide bar used for guiding the clearing plow or cleaning attachment. Thus, this machine track is not available for use as a support bearing surface for skids or runners at the face side of the mining machine.

West German patent specification No. 1,039,927 discloses scraper conveyors having conveyor runs disposed one above the other and formed with channel section members. The webs of such members have two outer flanges on the outside which are disposed one above the other for attachment thereto of guide bars, side brackets or the like.

West German patent specification No. 1,201,236 discloses lateral section members for scraper conveyors in which the members are formed with a substantially V-shaped configuration midway of their vertical heights. The lateral section members at each side have one or two outer flanges, one of which, the lower flange, extends to a central extension which is welded to the trough base plate. This flange serves for the attachment of a guide bar while the other and upper flange extends from the horizontal top inner flange of the lateral section member and is formed with apertures adapted to receive screws for securing a side bracket or guide bar thereto.

The section member type flanges of lateral section members as shown in the aforesaid West German patent specifications are relatively narrow and thin and, therefore, are suitable only for the attachment of guide bars and side brackets. The flanges are not suitable to bear the weight and guide a mining machine. The guide bars and side brackets are disposed either in the plane of the top flanges or at least above the floor on the outside of the lateral section member such that when subjected to the weight of the mining machine disposed above the conveyor, the stability thereof is impaired to a considerable extent.

SUMMARY OF THE INVENTION

It is an object of the present invention to provide an improved construction for a conveyor trough of the same general type described above through a special construction and arrangement of parts including lateral section members or parts thereof arranged such that they can be used for underground mining for a variety of purposes.

According to one aspect of the present invention, there is provided a conveyor trough for a scraper conveyor for use with a mining machine in underground mining, the conveyor trough comprising a trough base extending along a plane, diverging arm sections projecting laterally from each of the opposite longitudinal sides of the trough base, the arm sectionss at each side of the trough base forming intersecting boundaries of a V-shaped space diverging outwardly of the plane of the trough base, a flange extending from each diverging arm section which descends downwardly toward the mine floor, the flange having a width and thickness sufficient to form a machineway, and machine flanges each extending from a diverging arm section which ascends from the mine floor, the machine flange having a width and thickness sufficient to form a machineway generally parallel to the mine floor for movement of a mining machine therealong.

In a further aspect of the present invention, there is provided a conveyor trough for a scraper conveyor for use with a mining machine in underground mining wherein the conveyor trough comprises a trough base extending along a plane, diverging arm sections projecting laterally from each of the opposite longitudinal sides of the trough base, the arm sections at each side of the trough base forming boundaries of a V-shaped space diverging outwardly of the plane of the trough base, each V-shaped space being bounded by an arm section which descends toward the mine floor, a flange extending substantially parallel to the mine floor and extending from each diverging arm section which descends toward the mine floor, the flange having a width and thickness sufficient to form a machineway, and at least one top flange extending from a diverging arm section which ascends from the mine floor to bound the height of arm sections at one side of the trough base.

The present invention, therefore, provides that the ascending arm bounding a V-shaped space extends into a flange which projects from the arm such that the flange extends parallel to the floor and has width and thickness dimensions to form a machineway. A conveyor trough devised in a manner of the present invention is no wider than a conveyor trough built in the manner shown in the aforesaid West German patent specifications. However, the conveyor trough of the present invention provides the considerable advantage that, at the level of the top flange surfaces, a track or way is formed for the mining machine while the track or way is adapted for the arrangement and attachment of a guide for a cleaning attachment or clearing plow to the face side wall of the face conveyor. To improve the strength of the lateral section members of the conveyor trough of the present invention and to enable these members to withstand the great weight of a mining machine moving along them, according to another feature of the present invention, the two flanges disposed one above the other are interconnected by ribs disposed transversely to the length of the trough. The ribs are arranged to receive actuators such as piston and cylinder assemblies to advance the conveyor trough relative to the receding mine face. These two flanges may be interconnected by wall portions extending lengthwise of the conveyor trough. The wall portions are adapted to receive other components useful for the mining operation. The wall portions between the two flanges may extend along a reduced part of the length of the conveyor trough for attachment of components.

Desirably, the present invention further provides that when one or both lateral section members or parts of the conveyor trough are welded to the trough bottom, the laterally-projecting flange is in the top flange surface bounding the height of the diverging arm sections. This feature permits adapting the cross section of the trough to operating conditions in underground mining as early as the manufacturing stage. The machineways or tracks can be disposed on the face side and on the stow side (machine side) near the top plane of the conveyor or near the bottom plane of the conveyor, i.e., on the floor or even on the floor at one side of the conveyor and on the other side above the floor in the plane of the upper flange extending from a diverging arm section.

Another feature of the present invention insures that the stability of the conveyor trough is not impaired by the machineway or track disposed above the floor. For this purpose, the top flange forming the way or track is provided with ribs on the underside surface thereof transversely to the trough length and/or wall portions which extend lengthwise of the trough. The ribs extend to a bearing plate along the length of the trough section. The bearing plate is welded to the bottom part of the downwardly-extending diverging arm sections. The bearing plate surface which is near the floor is lower than the bottom surface of the downwardly-diverging arm sections. The bearing plate which is provided only in the side regions of the troughs transfers the weight of the machine to the floor and provides the necessary stability to the conveyor trough.

Alternatively, the ribs are arranged to cooperate with the bearing plates to form an independent component which is releasably connected to wall portions extending lengthwise of the trough and which take the form of retaining plates. A conveyor trough with a flange bearing only on the floor at the face side and a flange extending at the level of the top plane of the trough at the stow or machine side can be used for working a left-hand or right-hand mine face. The bearing plate and ribs take the form of a component which can be placed at choice on the left-hand or right-hand side of the conveyor. The flange on a diverging arm section is disposed in the top plane of the conveyor trough after a rotation of 180° about its longitudinal axis.

These features and advantages of the present invention as well as others will be more fully understood when the following description of various preferred embodiments thereof is read in light of the accompanying drawings, in which:

FIG. 3 is a view similar to FIGS. 1 and 2 but illustrating a further embodiment of the present invention;

FIG. 4 is an enlarged view of a junction in a trough base; and

FIG. 5 is a partial view, in cross section, of still a further embodiment of the present invention.

Figure 1:
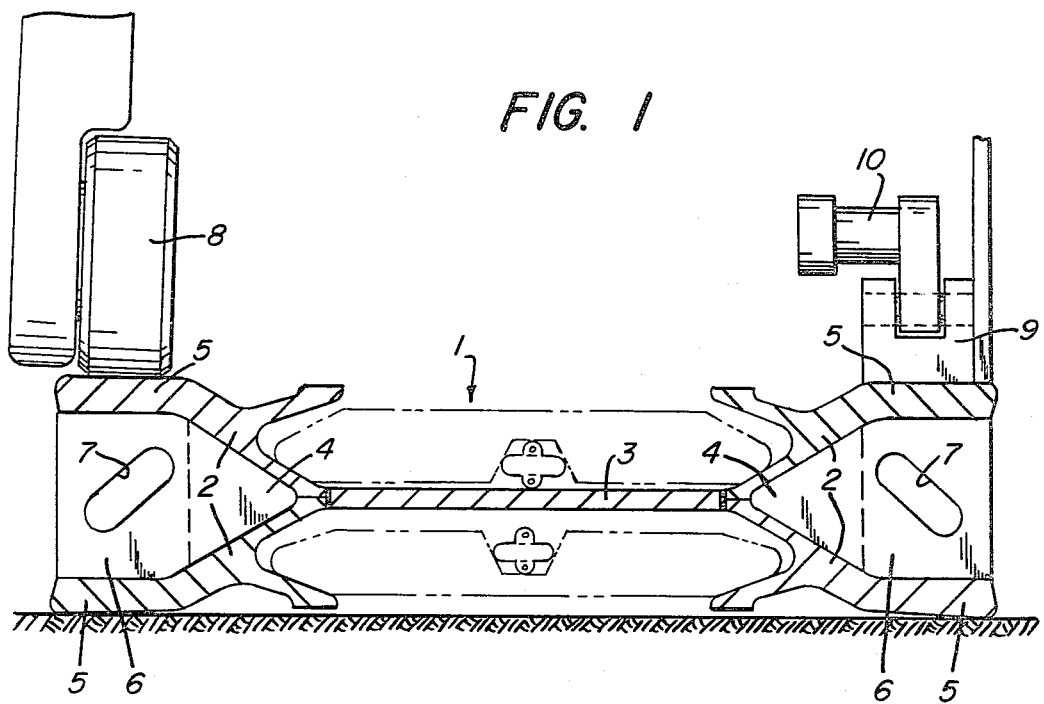
FIG. 1 is a cross-sectional view of one embodiment of the conveyor trough according to the present invention.

In the embodiment of the present invention shown in FIG. 1, reference numeral 1 identifies a conveyor trough that includes four lateral section members forming diverging arm sections 2 that are rigidly welded to one another and to a trough base 3 which extends between adjoined pairs of the arm sections. The arm sections can be rolled or extruded sections. The two lateral section members 2 which are joined together at each side of the trough base are identical section members arranged in a laterally-inverted relationship. A V-shaped space 4 is formed within the two lateral section members at each side of the trough base wherein coupling elements, not shown, interconnect the various trough sections to one another in a manner to provide and allow for relative movement between the sections. Two flanges 5 extend from the lateral section members at each side of the trough base 3. The flanges extend parallel to the floor and have a width and thickness of a machineway or track. Ribs 6 are distributed at intervals over the length of the conveyor section and extend the width of the flanges up to the V-shaped space 4. The ribs provide reinforcement for the flanges by engaging the undersurface of the top flange 5 at each side of the trough base and receive the weight of the mining machine. Ribs 6 are also adapted to receive components, for example, advancing cylinders adapted to engage in slots 7. The top flange 5 which is near the mineral face in an underground mine serves as a way or track for a roller runner 8 of a mining machine. At the stow side or machine side, the top flange 5 supports holders 9 that releasably carry a toothed rack 10 forming part of a drive to advance the mining machine along the conveyor trough.

Figure 2:
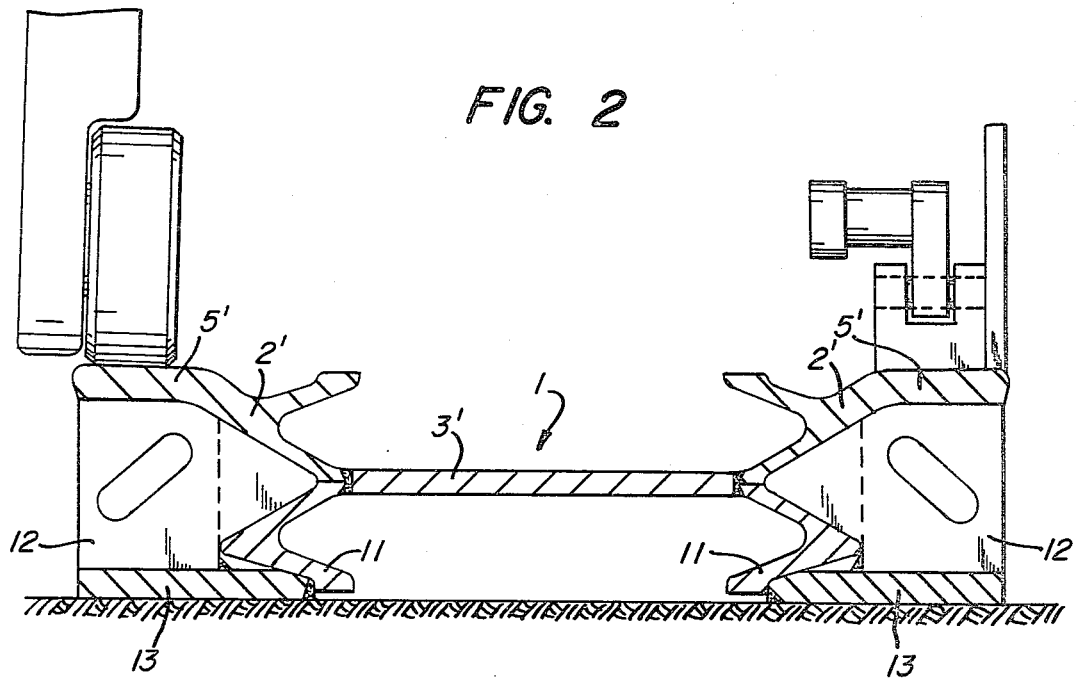
FIG. 2 is a cross-sectional view similar to FIG. 1 but illustrating an embodiment comprised of section members welded together.

In the embodiment of the present invention shown in FIG. 2, the two lateral section members at each side of the trough 1 are each embodied by two different diverging arm sections 2' and 11. The diverging arm sections 2' are welded to the trough base 3' and have a flange 5' extending parallel to the floor. One section projects toward the mine face and the other projects toward the stow or machine side. At each side of the trough, ribs 12 are distributed over the length of the flange 5'. The ribs extend transversely to the length of the conveyor and provide a connection to a bearing plate 13 which extends preferably over the whole length of the trough and rests on the mine floor. The bottom part of the downwardly-extending lateral section member 11 at each side of the trough is flangeless. Each arm section 11 is welded to the trough base 3', an arm section 2' and a bearing plate 13. The arm sections 11 serve to guide the scrapers along the bottom run of the conveyor and the associated chains or belts or the like. Bearing plates 13 improve stability and reduce the surface pressure of the trough 1 on the mine floor. The bottom surfaces of plates 13 are positioned lower than the bottom surfaces of arm sections 11. This insures support of the trough in the region of the two flanges that receive the relatively great weight of the mining machine.

A further arrangement of parts is illustrated in FIG. 3 according to another embodiment of the present invention wherein the arm sections 2' and 11' are arranged oppositely relative to one another at the sides of the conveyor trough 1. In this embodiment, at the face side of the conveyor, a machine track 5" extends toward the mine face for support on the mine floor. At the stow or machine side, however, the arm section 2" extends to a flange 5" which is parallel to the floor at a spaced relation thereabove as in the embodiments of FIGS. 1 and 2. A toothed rack 10' engaged by holders 9' is supported by flange 5" while a side bracket 14 is secured to the flange and closes the face conveyor 1 toward the stow side. For purposes of stability, this embodiment provides that only on the stow side, the bearing plates 13' are welded to the bottom of arm sections 11" and ribs 12'. Coupling elements used to interconnect the various sections of the conveyor are arranged as in the previously-described embodiments.

FIG. 5 illustrates a further embodiment in which the flanges 5''' supported by ribs 12' are welded only to an underlying bearing plate 13" and to retaining members 16. The ribs 12", bearing plate 3" and retaining members 16 form a component in this embodiment which is independent of the trough 1 and releasably secured to wall portions 15 which are welded in the V-shaped space to the arm sections for receiving a fastener such as threaded bolt. Piston and cylinder assemblies, not shown, for advancing the conveyor trough are secured to this independent component which can be mounted on either side of the conveyor trough. The independent component improves the stability of the conveyor and permits the use of the trough for either a right-hand or left-hand mineral face. The independent component is disposed for attachment to a wall portion 15 below a flange 5''' which is not on the floor. FIG. 4 illustrates a trough base embodying overlapping sections forming a junction for wear elements 17 which are welded in place in the trough base. The welded wear elements 17 which are formed without chipping extend over the width of the trough base and the conveyor scrapers can move in either direction.

In view of the foregoing, it will now be apparent to those skilled in the art that the arm sections projecting laterally from each of the opposite longitudinal sides of the trough base can be embodied as unitary rolled members or extrusions instead of identical or differently-shaped arm section members. Moreover, the cross section of the trough in the embodiments of FIGS. 1–3 may be provided with wall portions which extend lengthwise of the trough but over only a part of the length of the trough to interconnect the two top flanges 5 or a single top flange 5 with a bottom bearing plate 13. Such wall portions can be used for the attachment of components.

Although the invention has been shown in connection with certain specific embodiments, it will be readily apparent to those skilled in the art that various changes in form and arrangements of parts may be made to suit requirements without departing from the spirit and scope of the invention.

We claim as our invention:

1. A conveyor trough for a scraper conveyor for use with a mining machine in underground mining, said conveyor trough comprising a trough base extending along a plane, diverging arm sections projecting laterally from each of the opposite longitudinal sides of said trough base, the arm sections at each side of the trough base forming intersecting boundaries of a V-shaped space diverging outwardly of the plane of said trough base, a flange extending outwardly from each diverging arm section which descends toward the mine floor, said flange having a width and thickness sufficient to form a machineway, and a machine flange extending from each diverging arm section which ascends above the mine floor, said machine flange having a width and thickness sufficient to form a machineway generally parallel to the mine floor for movement of a mining machine therealong.

2. The conveyor trough according to claim 1 further including ribs disposed transversely to the extending length of said trough base to interconnect a flange extending from a downwardly-extending arm section and underlying a machine flange extending from an ascending arm section, said ribs being adapted to receive advancing means for said mining machine.

3. The conveyor trough according to claim 1 or 2 further including wall portions extending lengthwise of said trough base to receive components for said mining machine.

4. A conveyor trough for a scraper conveyor for use with a mining machine in underground mining, said conveyor trough comprising a trough base extending along a plane, diverging arm sections projecting laterally from each of the opposite longitudinal sides of said trough base, the arm sections at each side of the trough base forming boundaries of a V-shaped space diverging outwardly of the plane of said trough base, each V-shaped space being bounded by an arm section which descends toward the mine floor, a flange extending substantially parallel to the mine floor and extending from each diverging arm section which descends toward the mine floor, said flanges having a width and thickness sufficient to form a machineway, and at least one top flange extending from a diverging arm section which ascends from the mine floor to bound the height of said arm sections at one side of the trough base.

5. The conveyor trough according to claim 4 further including ribs disposed underneath said top flange transversely to the extended length of said trough base, and a bearing plate connected to an arm section which descends toward the mine floor below the bottom part thereof.

6. The conveyor trough according to claim 4 further including wall portions extending the length of said trough base, and a bearing plate below said wall portions and coupled with the bottom part of an arm section which descends toward the mine floor.

7. The conveyor trough according to claim 4 further including wall portions including retaining plates extending lengthwise of said trough base, and bearing plate means including flange support members releasably attached for support by said retaining plates.

* * * * *